Patented June 6, 1950

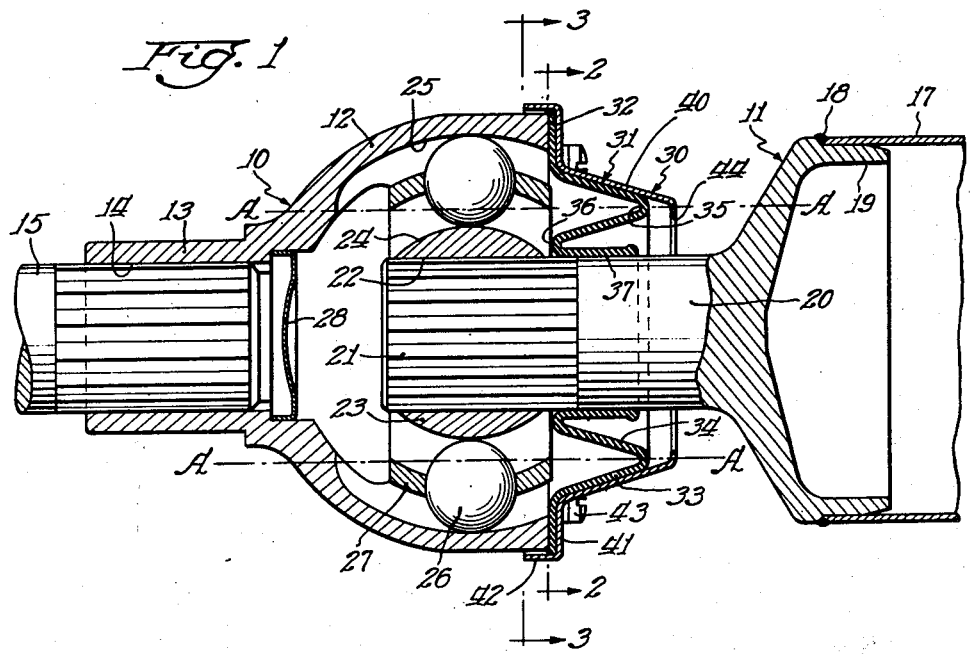
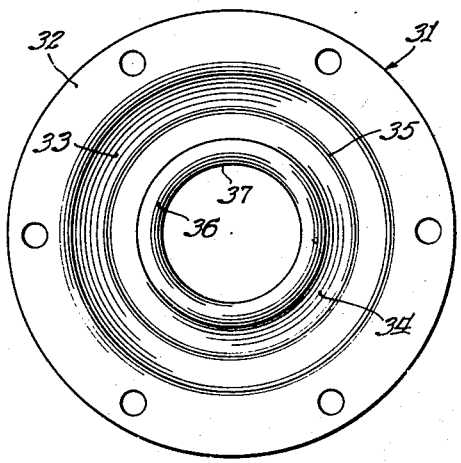
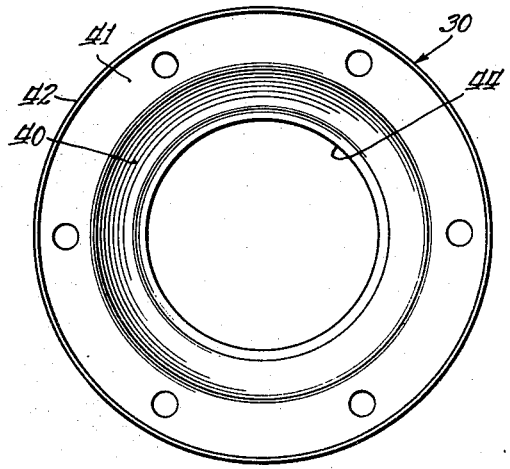

2,510,362

UNITED STATES PATENT OFFICE 2,510,362

SEAL

Edmund B. Anderson, Rockford, Ill., assignor to Borg-Warner Corporation, Chicago, Ill., a corporation of Illinois Application November 20, 1944, Serial No. 564,344

7 Claims. (Cl. 286—29)

This invention relates generally to seals and more particularly to seals for a pair of members connected together for universal motion, such as members of a "universal joint," in which one member includes a housing and the other member includes a shaft extending endwardly out of the open side of the housing.

Since moving parts of a universal joint require lubrication, it has been the practice to inject a charge of lubricant into the housing of the one member and to employ some sort of a seal to keep the lubricant from leaking out from between the housing and the shaft of the other member both when the joint is revolving and when it is motionless. Among the types of seals employed for this purpose at the present time are many of the flexible type which have their inner portion secured around the shaft and their outer portion secured about the opening in the housing. Oil resistant rubber has become the most common material for such seals since it combines imperviousness with great flexibility. However, such seals have suffered from an inherent defect which arises from the very flexibility of the material from which the seal is formed, which flexibility is necessary to permit universal motion of the shaft which extends endwardly from the housing of the other member. This defect is the tendency of the seal to become distorted or "bulged" by the centrifugal force exerted against it by the lubricant in the rotating housing. Numerous steps have been taken to remedy such defect, but so far as I know none of them have proven wholly satisfactory in operation.

It is an object of the present invention, therefore, to provide a flexible, impervious seal which is adapted to be securely sealed to the shaft and to the housing and which is prevented from bulging during operation. This object is achieved by employing a substantially non-flexible shielding means in conjunction with a flexible diaphragm.

A further object is to provide such a seal as will permit the universal motion desired but which will require only a small amount of flexibile material.

A further object is to have the construction of the seal such that it comprises a unit which is readily and easily attachable to or detachable from the universal joint for which it is adapted. This is made possible by the complementary configuration of the shielding means and portions of the flexible diaphragm and by the bonding of a portion of the complementary portions of the diaphragm to the inner surface of the shielding means.

My invention consists of the novel arrangements, constructions and devices hereinafter described and claimed for carrying out the above-stated objects and such others as will appear from a description of a preferred embodiment illustrated in the accompanying drawings, wherein:

Fig. 1 is a medial, longitudinal, sectional view showing my seal in conjunction with a universal joint;

Fig. 2 is an elevational view of the flexible diaphragm disassembled from the universal joint, as viewed in the direction indicated by the arrows on line 2—2 of Fig. 1; and Fig. 3 is an elevational view of the shield disassembled from the universal joint, as viewed in the direction indicated by the arrows on line 3—3 of Fig. 1.

Identical reference numerals are used for corresponding parts illustrated in the various figures of the drawings. Referring now to Fig. 1, there are illustrated two members, 10 and 11, joined together for universal motion. Member 10 consists of a housing 12 having a reduced end 13, and an internally splined socket 14 to receive the splined end of a shaft 15 which, for example, might be the output shaft from a gear set. Member 11 consists of a torque tube 17 welded as at 18 to the flanged end 19 of shaft 20. Shaft 20 extends into the open side of the housing 12 of member 10 and engages its splined end 21 with the internal splines 22 of a truncated spherical member 23.

The truncated spherical member 23 has circumferential ball receiving grooves 24 which correspond in size with complementary ball receiving grooves 25 cut internally of the inner spherical wall of the housing 12. Balls 26 positioned in these grooves 24 and 25 are the connecting means between members 10 and 11, which means permits the transfer of rotation between the members. Ball cage 27 which seats between the inner wall of housing 12 and the outer surface of the truncated spherical member 23 is shaped so as to be rotatable between said housing and member and to help guide the balls 26 during operation of the universal joint. A fluid-tight seal 28 at one end of housing 12 closes off the inside of the housing from its socket 14. At the other end of the housing—the end into which shaft 20 extends—there is provided a seal between the housing 12 and the shaft 20, which seal permits free universal motion by the shaft with respect to the housing.

Referring now to Figs. 1 and 2, reference numeral 30 designates generally a frusto-conical metallic shield or cover and reference numeral 31 designates generally a flexible diaphragm. The diaphragm 31 has at its radially outermost portion a flange 32 which is shaped to fit against and be secured to the right-hand edge of the housing 12, as viewed in Fig. 1. As illustrated in Figs. 1 and 2, the flange is circular to correspond to the edge of the housing. If the housing at its open end had a different shape, the flange 32 would be shaped in substantially the same way. Formed integrally with the flange and extending radially inwardly the diaphragm 31 has a frusto-conical wall portion 33 which tapers in a direction away from the housing 12. Another frusto-conical wall portion 34 of the diaphragm 31 tapers in a reverse direction with respect to wall portion 33 to which it is integrally joined, thereby forming a fold in the diaphragm with a resulting annular groove 35 where the wall portions 33 and 34 integrally join one another. Wall portion 34 tapers in a direction toward the housing 12 and converges on the shaft 20 and then bends back as at 36 in a reverse direction and takes a cylindrical shape which grasps the shaft 20 securely. Constructing said cylindrical portion 37 with a cross section corresponding to, but somewhat smaller than, the cross section of the shaft and giving said portion sufficient axial length, as shown, results in a fluid tight flexible seal about the shaft. As may be seen from Fig. 1 of the drawings, the cylindrical portion 37 of diaphragm 31 has its free end extending in a direction away from the housing 12. Because of the length of the cylindrical portion 37 of diaphragm 31 and the tightness with which it grasps the shaft 20 and because wall 34 joins the cylindrical portion 37 at a point close to the shaft and with small angularity, the bend at 36 and the cylindrical portion 37 will not draw away from the shaft 20 under the influence of centrifugal force.

Shield 30, which is illustrated in Figs. 1 and 3 as being formed with a metallic frusto-conical wall 40 and an integral flange 41 having a rim 42, is formed to fit over and in contact with the flange 32 and frusto-conical wall 33 of the diaphragm 31. If the wall 33 and flange 32 of the diaphragm had a different shape than that illustrated, the wall 40 and flange 41 of shield 30 would be formed in a corresponding shape. Wall 40, therefore, serves as a shield or backing for said diaphragm wall 33 to prevent it from being bulged or distorted under the action of centrifugal force exerted by the lubricant in the housing 12.

Normally, flange 32 of the diaphragm will be bonded to the corresponding flange 41 of the shield at its inner surface so that the diaphragm and shield may be kept together and handled as a unit. The flange 41 of the shield and the flange 32 of the diaphragm have matching holes which correspond with tapped bores in the edge of housing 12 so that screws 43 may be employed to clamp the flange 32 of the diaphragm between the housing 12 and the flange 41 of shield 30 so as to form a fluid tight seal between said diaphragm and the housing. Aperture 44 is formed in the shield sufficiently large to permit clearance with respect to shaft 20 during the shaft's maximum angular displacement.

Assembly of the seal with respect to the housing 12 and shaft 20 is simple. Because the flange 32 of diaphragm 31 is bonded to the flange 41 of shield 30, the seal forms a single unit which makes for easy attachment to the universal joint and also guards against separation and loss of the two elements of the seal during shipping or storage. Shaft 20 being first freed from connection with the truncated spherical member 23, the aperture 44 of the shield and the cylindrical sleeve 37 of the diaphragm are passed over the splined end 21 of shaft 20 until substantially the whole length of cylindrical portion 37 grasps the shaft 20. Since the diameter of the cylindrical portion 37 is less than the diameter of shaft 20, a fluid tight seal results. The splined end 21 of shaft 20 is then introduced into the central portion of the truncated spherical member 23 and the screws 43 are passed through the matched holes in the flanged portions of the shield and diaphragm. Said screws are then threaded into the adjacent bores located in the edge of housing 12 and are drawn up tight. The flange 32 of diaphragm 31 is thereby sealed in fluid tight relationship to the housing 12.

The charge of lubricant disposed in housing 12 will be such that during operation of the joint the lubricant will normally assume a position around the wall of housing 12 lying radially outwardly beyond the lines A—A of Fig. 1. Thus during operation all centrifugal force exerted by the lubricant against the seal will be directed against frusto-conical wall 33 of the diaphragm 31 which wall is backed by wall 40 of the shield 30. If too much lubricant is accidentally put in the housing 12 so that the centrifugal level of lubricant extends radially inwardly toward shaft 20 beyond lines A—A of Fig. 1, the seal is still protected against bulging by reason of the fact that the only portion of the diaphragm 31 which is subject to direct centrifugal force is wall 33 which is backed by wall 40 of the shield 30. Wall 34 of the diaphragm would be subject only to a slight axial component, if any, of the centrifugal force exerted by such excess lubricant.

Since the bend at 36 is at a slight angle and is positioned close to the shaft 20 there will be no under-surface of the bend 36 against which centrifugal force of the lubricant may act and there will be practically no tendency for the bend itself or the integrally related wall 34 or cylindrical portion 37 to move radially outwardly from the shaft 20 as a result of the rotation of the universal joint. The fold, produced by walls 33 and 34 of the diaphragm, plus the sleeve 37 allow universal angular movement of shaft 20 without any danger of the seal's being undesirably tensioned at any point. Axial movement of shaft 20 with respect to housing 12 is also freely permitted without breaking the fluid-tight character of the seal because of several factors, namely, the length of the grip which the cylindrical sleeve 37 has on shaft 20, the ability of the diaphragm 31 to adjust its shape (for example, at the bends 35 and 36) as the shaft moves in and out of the housing, and the ability, generally, of the diaphragm 31 to flex axially as well as radially.

As a result my seal is compact, flexible and fluid-tight and cannot be bulged by the action of the lubricant in the housing of the universal joint. In addition, it has the advantage of being substantially unitary by reason of the flange of the diaphragm being bonded to the flange of the seal. This permits the seal to be easily attached to or detached from the universal joint.

Although the seal has been described in conjunction with a universal joint, it is adaptable for other uses without departing from the scope of my invention and I do not, therefore, intend to be limited to the use herein described, except in so far as limited by the appended claims.

I claim:

1. In combination, a hollow tapering shield having two open ends, said shield being substantially rigid and being adapted to be supported from its larger end, and an annular flexible diaphragm comprising radially outer and inner portions, said radially outer portion having a tapered shape whereby said outer portion may fit within and be backed by said tapering shield, and a sleeve, said inner portion being a joining portion reversely tapered relative to said outer portion, which joining portion integrally joins said outer portion and said sleeve.

2. In combination, a hollow tapering shield having two open ends, said shield being substantially rigid and being adapted to be supported from its larger end, and an annular flexible diaphragm comprising radially outer and inner portions, said radially outer portion having a tapered shape whereby said outer portion may fit within and be backed by said tapering shield, and a sleeve, said inner portion being a joining portion reversely tapered relative to said outer portion and integrally joining said outer portion and said sleeve, the free end of said sleeve extending in the same general direction as the direction taken by said outer portion and said joining portion in forming a junction with each other.

3. In combination, a hollow frusto-conical shield having two open ends and a flange at the larger end, said shield being substantially rigid and being adapted to be supported by said flange, and an annular flexible diaphragm comprising radially inner and outer portions, said radially outer portion having a frusto-conical shape whereby said outer portion may fit within and be backed by said shield, and a cylindrical sleeve, said radially inner portion being a frusto-conical joining portion reversely tapered relative to said outer portion and integrally joining said outer portion and said cylindrical sleeve.

4. In combination, a hollow frusto-conical shield having two open ends and a flange at the larger end, said shield being substantially rigid and being adapted to be supported by said flange, and an annular flexible diaphragm comprising radially outer and inner portions, said radially outer portion including a flange integrally joined to a frusto-conical wall portion, said wall portion fitting within and being backed by said shield, and a cylindrical sleeve, said radially inner portion being a frusto-conical joining portion reversely tapered relative to said wall portion and integrally joining said wall portion and said cylindrical sleeve, said cylindrical sleeve having its free end extending in the same general direction as the direction taken by said wall portion and said joining portion in forming a junction with each other.

5. In combination, a sealing diaphragm having an outer anchoring edge and an inner anchoring sleeve and an intermediate section having radially inner and outer walls which define an annular groove, each of said walls at its free end being integrally joined to one of the anchoring portions, and a hollow tapering shield having two open ends, the larger of said ends being adapted to overlie the anchoring edge of said diaphragm, and the shield being adapted to overlie and serve as a backing for the radially outer wall of the intermediate section of said diaphragm.

6. In combination, a sealing diaphragm having an outer anchoring flange and an inner anchoring cylindrical sleeve and an intermediate section comprising an outer frusto-conical wall integrally joined at its radially outer end to said flange and integrally joined at its radially inner end to the radially outer end of a second frusto-conical wall portion which tapers in the reverse direction, the radially inner end of said second wall being integrally joined with an end of said cylindrical sleeve, said sleeve having its free end extending in the same general direction as the direction taken by said walls in forming a junction with each other, and a hollow shield comprising a frusto-conical wall portion having two open ends and a flange at the larger of said ends, said flange being adapted to overlie the diaphragm flange and said frusto-conical wall portion being adapted to overlie and serve as a backing for said outer frusto-conical wall of said diaphragm.

7. In combination, an annular sealing diaphragm of Z-shape cross section having an outer anchoring flange and an inner anchoring sleeve and an intermediate body portion having radially inner and outer walls overlying each other in a plane intersecting the axis of the diaphragm to define an annular groove, the radially outer wall being integrally joined at its free end to said flange and the radially inner wall being integrally joined at its free end to said anchoring sleeve, and a hollow shield having two open ends and a flange at one of said ends, the flange of said diaphragm being secured to the inner surface of the flange of said shield and the radially outer wall of said diaphragm being backed by said shield.

EDMUND B. ANDERSON.

REFERENCES CITED

The following references are of record in the file of this patent:

UNITED STATES PATENTS

| Number | Name | Date |
|---|---|---|
| 830,203 | Bogart | Sept. 4, 1906 |
| 1,397,413 | Evans | Nov. 15, 1921 |
| 1,788,894 | Schjolin | Jan. 13, 1931 |
| 1,854,667 | Ragan | Apr. 19, 1932 |
| 1,871,883 | Geyer | Aug. 16, 1932 |
| 2,208,700 | Murden | July 23, 1940 |
| 2,323,569 | Rzeppa | July 6, 1943 |

FOREIGN PATENTS

| Number | Country | Date |
|---|---|---|
| 98,132 | Switzerland | 1923 |